Aug. 13, 1940.    D. H. MONTGOMERY    2,211,344
CHUCK SLOT SEAL
Filed Dec. 16, 1938
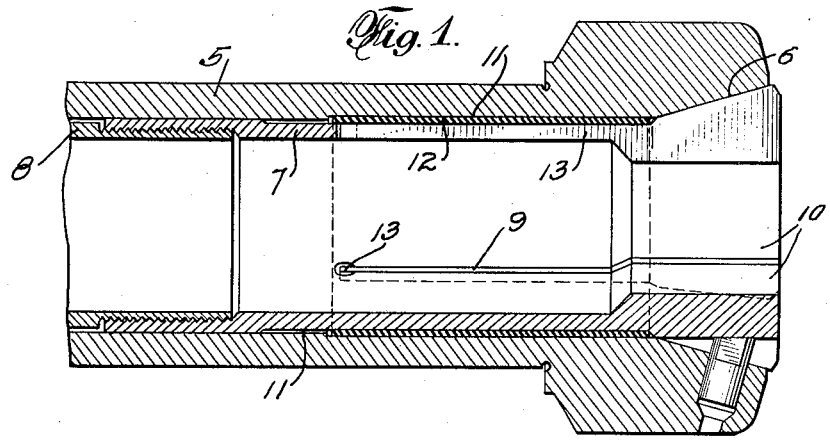
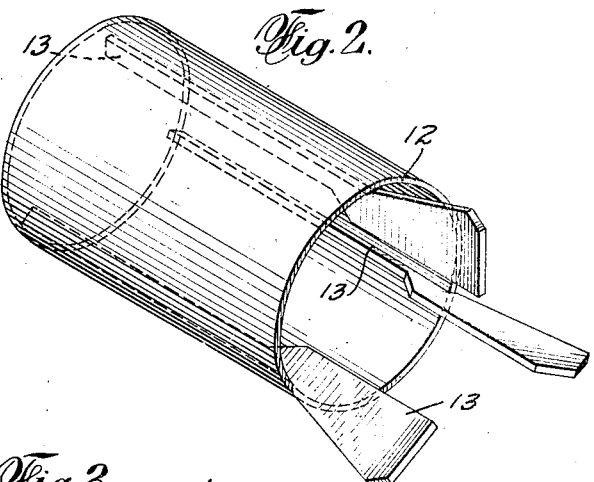
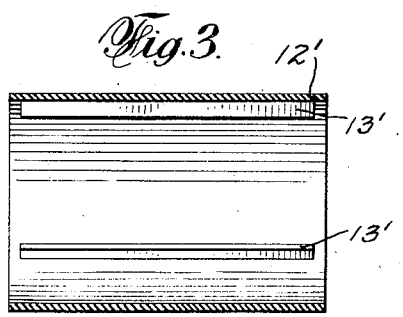
INVENTOR
DONALD H. MONTGOMERY
BY
ATTORNEYS.

Patented Aug. 13, 1940

2,211,344

UNITED STATES PATENT OFFICE 2,211,344

CHUCK SLOT SEAL

Donald H. Montgomery, West Hartford, Conn., assignor to The New Britain Machine Company, New Britain, Conn., a corporation of Connecticut Application December 16, 1938, Serial No. 246,112

4 Claims. (Cl. 279—46)

My invention relates to a chuck slot seal.

A collet chuck usually comprises a tubular member or sleeve with jaw portions at the ends. Radial slots extend in longitudinally so as to form spring arms, whereby the jaws are resiliently supported so that the jaws may open and close when moved back and forth in the spindle, all as will be understood. There is usually a clearance space between the outside surface of the slotted sleeve portion of the collet and the inside of the spindle. In operation this clearance space sometimes fills up with chips which become wedged in so as to sometimes affect the operation of the collet and which render removal of the collet from the spindle an exceedingly difficult operation.

It is an object of my invention to provide an improved form of seal to prevent chips and foreign matter from working through the slots of a collet and into the space surrounding the latter.

Another object is to provide an improved form of seal for a collet which is simple in construction, effective in use, easy to apply, and which will be securely held in place.

Other objects and various features of invention will be hereinafter pointed out or will become apparent to those skilled in the art.

In the drawing which shows, for illustrative purposes only, preferred forms of the invention—

Fig. 1 is a central longitudinal sectional view through a spindle and collet, illustrating features of the invention;

Fig. 2 is a detail isometric view of one form of seal; and

Fig. 3 is a central longitudinal sectional view through a slightly modified form of seal.

In said drawing 5 indicates a spindle having a tapered mouth, in this case an outwardly flared opening 6 for receiving a drawback collet. The collet in this case comprises a sleeve member 7, to be secured to the chucking tube 8. The sleeve 7 is slotted longitudinally, as indicated at 9. In the present instance three slots are provided. At the end of the sleeve 9 are three collet jaws 10, having backwardly tapering surfaces to fit the mouth of the spindle, all as will be understood.

In order to provide for free action of the collet there is a circumferentially extending clearance space 11 between the outside of the sleeve 7 and the inside of the spindle 5. It is in this space that chips and foreign matter sometimes collect in the conventional collets and give rise to the difficulties heretofore noted. My invention relates to improved seal means for the collet.

In the form shown in Figs. 1 and 2 I employ a thin sleeve 12 of yielding material to fit about the outside of the sleeve 7 and in the clearance space 11 between the sleeve and the spindle. The sleeve 12 may be made of several materials but is preferably formed of molded artificial rubber and may be of the type known in the trade as "Neoprene." This seal sleeve may be secured to the outside of the sleeve 7 or may be held in place thereon merely by its inherent resiliency. In order to further prevent chips and foreign matter from working through the slots 9 and into the clearance space 11 the sleeve may be provided with integral inwardly directed fins 13—13 to fit in the slots 9 and between the jaws of the collet. These fins preferably extend substantially flush with the inside of the sleeve 7 and the inside of the jaws. Thus, foreign matter will be prevented from working through the slots and into the clearance space.

In some cases it may not be necessary to prevent chips from entering the slots between the jaws themselves, since in most cases the coolant will wash out any foreign matter. Therefore the fins may terminate in the slots 9 and not extend out in the slots between the jaws. Such a construction has been illustrated in Fig. 3, wherein the sleeve 12' is provided with fins 13', which simply fill the slots in the sleeve beneath the clearance space 11. Furthermore, in some cases it may be sufficient to omit the fins altogether and rely upon the sleeve in the clearance space. However, the fins tend to prevent chips and foreign matter from ever reaching the inside of the sleeve and thus act as a protection against the possibility of entry of chips into the clearance space even on the inside of the sleeve 12.

Furthermore, a sleeve like 12 could be inserted in the collet, since there is considerable space between the stock and the inside of the collet sleeve or tube. Such a sleeve like 12 might be provided with externally projecting fins to extend between the jaws. The sleeve, whether internal or external, could be secured in place in suitable manner as by vulcanizing the same in place in or on the collet. In some cases the fins alone will be sufficient, that is to say, strips of the yielding material may be secured in the slots as by vulcanizing the same in place therein.

While the seal sleeve 12 has been shown as circumferentially continuous, it could nevertheless be split in one or more places if the purpose is only to hold the fins in place. The illustrated forms, however, are preferred.

My improved seal may be comparatively cheaply made and easily slipped in place. The sleeve is yielding and does not interfere with the proper action of the collet and offers no substantial resistance to withdrawal of the collet when that becomes necessary.

While the invention has been described in considerable detail and preferred forms illustrated, it is to be understood that various changes and modifications may be made within the scope of the invention as defined in the appended claims.

I claim:

1. A collet including a slotted sleeve and jaws, and a thin sleeve of yielding material surrounding the slotted sleeve, said sleeve of yielding material having integral fins extending into the slots of said slotted sleeve and between the said jaws, for the purpose described.

2. A collet including a slotted sleeve and jaws, and a thin sleeve of yielding material surrounding said slotted sleeve and having integral fins extending into the slots of said slotted sleeve.

3. A spindle, a collet therein, said collet having a sleeve with longitudinal slots therein, said spindle and collet having a circumferential clearance space therebetween, and a sleeve of yielding material surrounding said collet sleeve in said clearance space for closing the slots in said collet sleeve and preventing foreign matter from working through said slots to the outside of said collet sleeve.

4. A collet including a slotted sleeve and jaws, and a thin sleeve of yielding material, one of said sleeves fitting within the other to cause the slots of said slotted sleeve to be covered by the other sleeve to prevent foreign matter from passing through the slots to the outside of said slotted sleeve.

DONALD H. MONTGOMERY.